H. R. HUGHES.
ROTARY BORING DRILL.
APPLICATION FILED JUNE 20, 1913.

1,131,701.

Patented Mar. 16, 1915.

Witnesses:
Geo. R. Radson
C. M. Badger

Inventor,
Howard R. Hughes.
By Bakewell & Cornwall Attys.

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

ROTARY BORING-DRILL.

1,131,701.   Specification of Letters Patent.   Patented Mar. 16, 1915.

Application filed June 20, 1913.   Serial No. 774,774.

*To all whom it may concern:*

Be it known that I, HOWARD R. HUGHES, a citizen of the United States, residing at Houston, Texas, have invented a certain new and useful Improvement in Rotary Boring-Drills, of which the following is a full, clear, and exact description, such as will enable others skilled in the art to which it appertains to make and use the same.

This invention relates to boring drills of the type which comprise a head provided with a cutting member or members that rotate when the head is revolved and thus cut and disintegrate the material in which the hole is being drilled.

One object of my invention is to provide a rotary boring drill that is particularly adapted for use in gumbo, shale and hard clay, and which is so designed that the rotatable cutting members of same have a combined cutting, scraping and crushing action on the material in which the hole is being drilled.

Another object is to provide a boring drill having cutters which are so designed and arranged that the bottom of the hole formed by the drill will be approximately hemispherical shape, thus tending to center the drill in the hole and cause the cutters of same to cut true.

Another object is to provide a rotary boring drill which is so designed that there is little tendency for the disintegrated material to pack between the cutting members when the drill is in service.

Another object is to provide a rotary boring drill having rotatable cutting members which are so designed and arranged that the action of same on the material tends to keep them sharp.

And still another object is to provide a strong, serviceable, and inexpensive rotary under-reamer drill, namely, a drill that will form a hole of greater diameter than a hole which is just large enough to permit the drill to be introduced into same.

Other objects and desirable features of my invention will be hereinafter pointed out.

Figure 1:
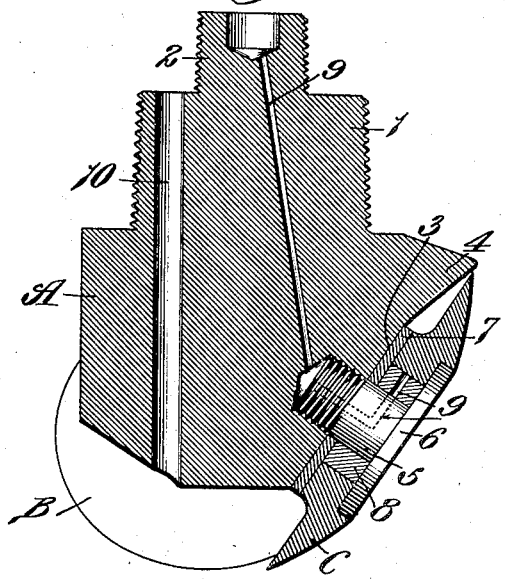
Figure 2:
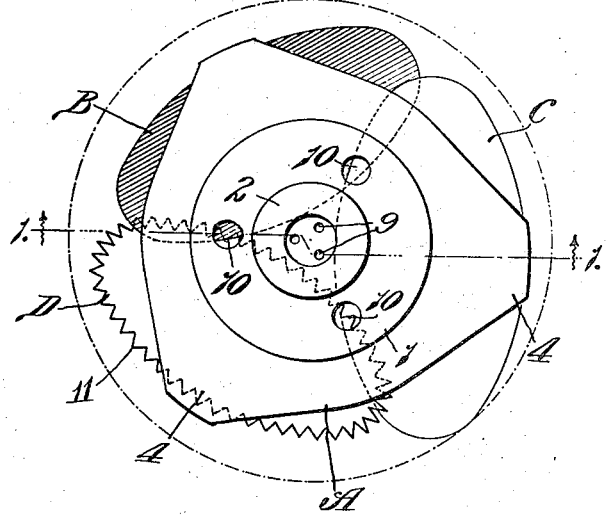

Figure 1 of the drawings is a vertical sectional view of a rotary boring drill constructed in accordance with my invention; and Fig. 2 is a top plan view of said drill.

Referring to the drawings which illustrate the preferred form of my invention, A designates the head of the drill which preferably consists of a block of metal provided at its upper end with a screw-threaded boss 1 for receiving the tubular drill stem or operating member, not shown, and also with a flange 2 for receiving a lubricant-holder, not shown.

A plurality of rotatable cutting devices are mounted on the head A so as to cut and disintegrate the material when said head is revolved.

In the embodiment of my invention herein shown three substantially disk-shaped cutters B, C and D are rotatably mounted on the head A in such a manner that the lower ends of same incline inwardly toward the vertical center of the head A, as shown in Fig. 1, and said cutters are preferably so arranged that the edge portions of same partly overlap, as shown in broken lines in Fig. 2. The head A is provided at its lower end with three flat inclined faces 3 that form bearing surfaces for the inner sides or inner ends of the cutters B, C and D, and said head is also preferably provided with laterally projecting portions 4 that hang over said cutters slightly, as shown in Fig. 1, and thus prevent them from catching on projections in the hole when the drill is being pulled out of the hole. The cutters B, C and D can be connected to the head in various ways without departing from the spirit of my invention but they are preferably so arranged that they have a shearing action on the material when the head A is rotated instead of a true rolling action. I accomplish this by setting the cutters B, C and D so that their axes of rotation terminate at points a trifle to one side of the vertical axis of the head. In other words, the axis of rotation of each cutter is disposed tangentially with reference to the vertical axis of the drill head instead of radially, thereby causing the forward edge of the cutter to shear through the material.

In the drill herein shown each cutter is connected to the head by means of a spindle 5 screwed into the head and provided at its outer end with a head 6 that is seated in a recess formed in the outer face of the cutter. A washer 7 is arranged between the inner face of the cutter and the flat face on the head A that takes up the thrust of the cutter, and a bushing 8 of bronze or some other suitable material is arranged on the spindle so as to form a good bearing surface for the roller.

Lubricating ducts 9 are formed in the head and in the spindles for the cutters so as to supply a lubricant to the cutters, and water-holes 10 are formed in the head so as to discharge jets of water onto the material which the cutters disintegrate, said water-holes 10 being so located that the jets of water will be projected onto the cutters adjacent the points where they overlap, as shown in Fig. 2.

All of the cutters may be of the same size, or, if desired, one of the cutters may be larger or of greater diameter than the others so that the drill can be used for under-reaming a hole. The drill herein shown is constructed in this manner and is provided with two cutters B and D of the same diameter and an intermediate cutter C of greater diameter than the cutters B and D. Such a drill can be introduced into a hole whose diameter is only a trifle greater than the extreme diameter of the drill, but when the head of the drill is rotated the cutter C will cut a hole or describe a path of much greater diameter than the extreme diameter of the drill as indicated by the broken lines in Fig. 2.

The cutters are substantially disk-shaped, but are thick enough so that they will be strong enough to successfully withstand the weight of the drill stem and the downward pressure that they are subjected to when the drill is in service. The outer surfaces of said cutters are approximately convex-shaped, so as to produce a sharp cutting edge at the inner side of each cutter and a comparatively broad crushing surface on the outer side of each cutter that lies beyond or outside of said sharp edge and which crushes and pulverizes the material at the bottom of the hole.

The cutters B, C and D not only cut or shear through the material in which the drill is operating, but they also scrape off the material and crush it, thus making the drill particularly well adapted for use in gumbo, shale and hard clay. The cutters are inclined at such an angle that the lower edges of same reach almost to the center of the hole, thus leaving only a small core or projection at the center of the bottom of the hole which is crushed off progressively by the vibration of the drill. In view of the fact that the cutters are of such shape and are mounted on the head in such a manner that they form a hole whose bottom or lower end is approximately hemispherical shape, the drill remains centered in the hole and does not wabble from side to side when it is in operation; and still another desirable feature of such a drill is that there is little tendency for the disintegrated material to pack between the cutters owing to the fact that the cutters overlap and the jets of water are discharged directly onto the overlapping portions of the cutters.

While my improved drill is particularly adapted for drilling shale and similar material, it can also be used with good results in soft rock in view of the fact that the weight and downward pressure that the drill stem exerts on the head causes the sharp edges of the cutters to sink into the formation and the rotary movement of the head causes the cutters to scrape off the material and crush or pulverize it. Furthermore, the cutters are so mounted that the action of same on the material causes their cutting edges to remain sufficiently sharp to trim off any bowlders or projections that they encounter during the rotary movement of the head, thus keeping the hole true.

The drill is inexpensive to manufacture, it is strong and serviceable, and in addition to being an efficient drill for general use in comparatively soft formations it can be easily converted into an underreamer by providing the head with one cutter which is slightly larger than the other cutters on the head. The disks can be provided with straight cutting edges or one or more of the disks can be provided with cutting teeth 11, as shown in Fig. 2.

Having thus described my invention, what I claim as new and desire to secure by Letters Patent:

1. A rotary boring drill provided with a plurality of comparatively sharp-edged cutters whose axes of rotation are inclined downwardly and outwardly from the vertical axis of the drill, said cutters being so arranged that the edge portions of same partly overlap.

2. A rotary boring drill comprising a head provided with a disk-shaped cutter whose lower edge portion inclines inwardly, said cutter being so arranged that the edge portion of same shears off the material from the side wall of the hole, and a portion on the head that prevents the edge of the cutter from catching on projections in the hole when the drill is being withdrawn from the hole.

3. A rotary boring drill comprising a head provided with a plurality of disk-shaped cutters that incline inwardly under the lower end of the head, said cutters being so arranged that the edge portions of same partly overlap.

4. A rotary boring drill comprising a head provided with a plurality of disk-shaped cutters that incline inwardly under the lower end of the head, said cutters being so arranged that the edge portions of same partly overlap, and water-holes in the head which are so disposed that jets of water will be projected onto the cutters adjacent the points where they overlap.

5. A rotary boring drill consisting of a head, disk-shaped cutters on said head which incline under the lower end of the head, said cutters being so arranged that the edge portions of same shear off the material from the side wall of the hole, each cutter being provided with a substantially convexed crushing portion that disintegrates the material on the bottom of the hole when the drill is in operation, and portions on the head that tend to prevent the cutters from catching on projections in the hole when the drill is being removed from the hole.

6. A rotary boring drill consisting of a head provided with a plurality of sharp-edged disk-shaped cutters whose lower ends are inclined inwardly toward the vertical axis of the head, one of said cutters being of greater diameter than the others so that it will describe a circular path of greater diameter than the extreme diameter of the drill.

7. A rotary boring drill comprising a head provided with a plurality of substantially-disk-shaped cutters that incline inwardly under the lower end of the head, said cutters being so arranged that the edge portions of same partly overlap and one of said cutters being provided on its edge with teeth.

In testimony whereof I hereunto affix my signature in the presence of two witnesses, this eleventh day of June, 1913.

HOWARD R. HUGHES.

Witnesses:
HYMAN LEVIN,
EARL LEIB.